GEORGE W. DYER.

Links.

No. 124,556.  Patented March 12, 1872.

Witnesses.  Inventor.

UNITED STATES PATENT OFFICE.

GEORGE W. DYER, OF CRESTLINE, OHIO.

IMPROVEMENT IN LINKS.

Specification forming part of Letters Patent No. 124,556, dated March 12, 1872.

*To all whom it may concern:*

Be it known that I, GEORGE W. DYER, of Crestline, in the county of Crawford and State of Ohio, have invented a certain new and useful Improvement in Links; and I do hereby declare the following to be a full, clear, and exact description thereof, reference being had to the annexed drawing, forming a part of the same, and in which—

Figure 1:
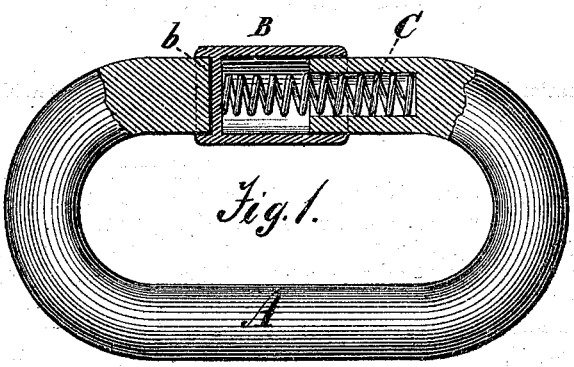
Figure 2:
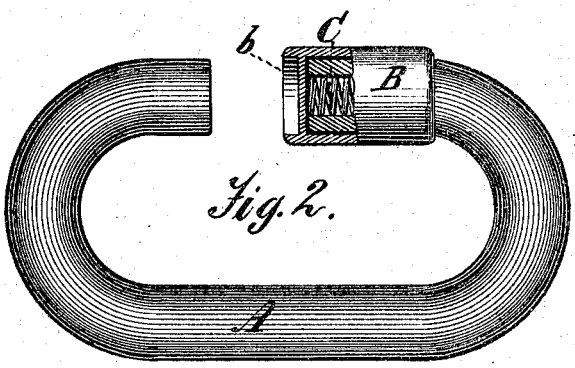

Figure 1 represents a view of my link, partly in side view and partly in section, exhibiting the sleeve which forms the connection between the disconnected parts of the link proper thrown forward, filling the aperture or opening between said parts and the spring retaining it, the sleeve in such position extended; and Fig. 2 represents a similar view thereof, showing the said sleeve pushed back, opening the link for the reception of one of the links of a chain which it is desired to attach thereto, and the spring above alluded to compressed.

Like parts in the two figures are designated by corresponding letters.

This invention has reference to that class of devices denominated links; and it consists of a fastening for the same, constituted of a sleeve having a flange or cavity and a spring, substantially as hereinafter more fully set forth and claimed.

To enable others skilled in the art to which my invention appertains to make and use the same, I will proceed to describe it.

In the annexed drawing, A refers to the link proper, which is disconnected in such a manner as that it shall be furnished with an opening of such a size as to conveniently permit of the insertion of a link of its own, or any known common size which it is desired to attach thereto. B is a sleeve, fitting around the link A, and provided on its interior with a partition, *b*, against one side of which fits one end of the disconnected link when the said sleeve is thrown forward in such a manner as to close the opening formed by such disconnection, while its opposite side furnishes a bearing for the spring, which automatically carries said sleeve in the direction last or above mentioned, the projecting or flanged portion of the said sleeve embracing and encircling the end of the link, by which the sleeve is caused, in connection with the said spring, to firmly grasp the said end of link. C refers to a spiral or coiled spring, which is confined at one end within a recess or slot made in that end of the disconnected link over which the sleeve B slides, and pressing at its opposite end as above stated against the partition *b* of the said sleeve. As already partly stated, this spring is for the purpose of automatically carrying or throwing forward the sleeve B after pressure has been relieved from the latter, and assisting in holding it upon the link.

Having thus described my invention, what I claim, and desire to secure by Letters Patent, is—

A fastening for an open link, consisting of the sleeve B, having a flange or cavity, *b*, and the spring C, arranged and operating with the link, substantially as shown and described.

In testimony whereof I have signed my name hereto this 25th day of December, A. D. 1871, in the presence of two attesting witnesses.

G. W. DYER.

Witnesses:
  WM. POPE,
  JAMES WALSH.